Dec. 29, 1970  H. NELSON  3,551,842
SEMICONDUCTOR LASER HAVING HIGH POWER OUTPUT AND REDUCED THRESHOLD
Filed March 27, 1968  2 Sheets-Sheet 1
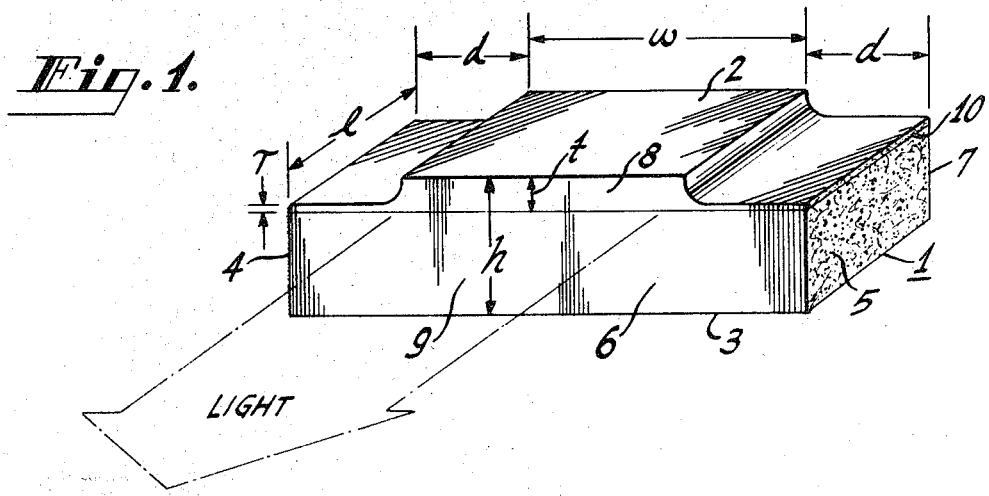
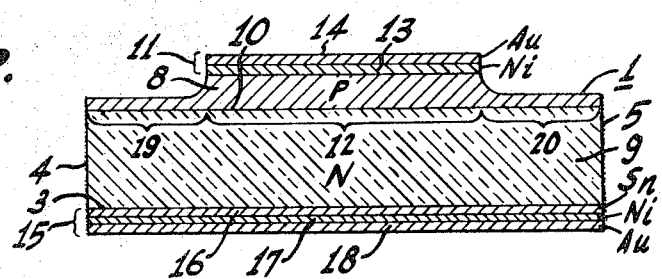
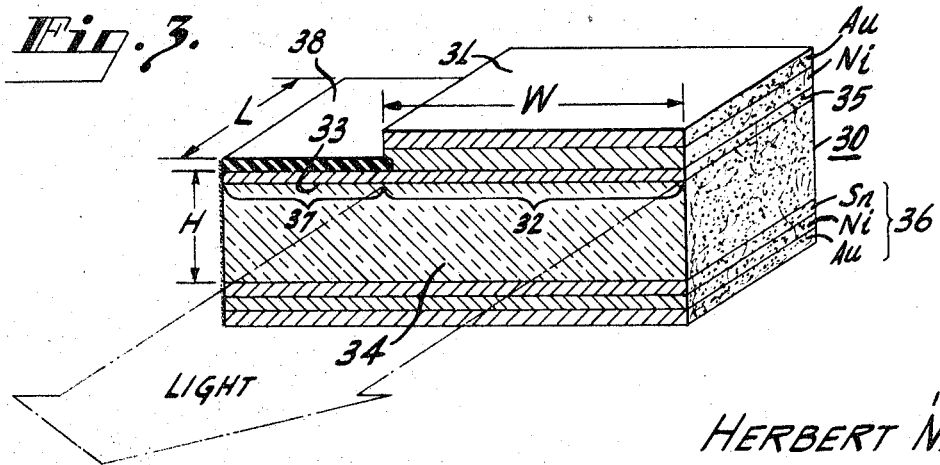
INVENTOR
HERBERT NELSON
BY
ATTORNEY

INVENTOR
HERBERT NELSON

BY

ATTORNEY

United States Patent Office 3,551,842
Patented Dec. 29, 1970

3,551,842
SEMICONDUCTOR LASER HAVING HIGH POWER
OUTPUT AND REDUCED THRESHOLD
Herbert Nelson, Princeton, N.J., assignor to RCA
Corporation, a corporation of Delaware
Filed Mar. 27, 1968, Ser. No. 716,538
Int. Cl. H01s 3/18
U.S. Cl. 331—94.5                    8 Claims

ABSTRACT OF THE DISCLOSURE

A semiconductor laser of the injection type in which the width of the light emitting region is greater than the length of the semiconductor body between the reflective surfaces which form the resonant optical cavity. Current flow is confined to a principal portion of the P-N junction plane. The remainder of the junction plane does not exhibit gain, and serves as a photon absorbing region to attenuate undesired parasitic optical modes, thus reducing the lasing threshold of the device.

BACKGROUND OF THE INVENTION

The invention herein described was made in the course of or under a contract or subcontract thereunder with the Department of the Army.

This invention relates to semiconductor lasers, and more particularly to injection lasers exhibiting relatively high power output.

Semiconductor lasers of the injection type generally operate by injecting minority carriers across a P-N junction, where they combine radiatively with majority carriers to generate visible, infrared or ultraviolet light. The semiconductor body is provided with a pair of spaced reflective surfaces to provide an optical cavity between the surfaces.

When a current is passed across the P-N junction in the forward bias direction, and the current exceeds a predetermined threshold value where the net amplification due to stimulated emission exceeds the net attenuation within the device, optical regeneration or lasing occurs, with subsequent emission of coherent light through the (partially) reflective surface(s).

In order to obtain practical semiconductor lasers of reasonable power output capability, it is necessary to reduce the threshold current to as low a value as possible. If this is not done, the threshold current may be so large that under these conditions, Joule heating will destroy the device before laser action can be obtained.

At the present state of the art, room temperature injection laser operation on a continuous basis is not obtainable, and pulsed operation is limited to low duty cycles.

One technique for improving the threshold of an injection laser is to fabricate the semiconductor body in the form of a rectangular prism which is relatively long in the direction extending between the reflective surfaces and relatively narrow in the direction extending between the device sides, the device electrodes being disposed on the upper and lower surfaces of the semiconductor body. The use of such an elongated structure is based upon the principle that the gain for optical modes traveling between the reflective surfaces, i.e. the desired modes, is maximized (gain is proportional to crystal length) while the gain for undesired or parasitic modes in other directions will be minimized.

A device of this type is shown, e.g., in U.S. Pats. 3,248,-670, 3,341,937 and 3,349,475. In the limit this type of lasers approaches a line or stripe, as exemplified by U.S. Pat. 3,363,196.

Lasers of the filamentary type, however, suffer from the disadvantage that the junction width at the point where the coherent light leaves the semiconductor (partially reflective) surface is relatively small, so that only a limited power output is obtainable.

Accordingly, an object of the invention is to provide an injection laser capable of relatively high power output.

SUMMARY

The invention provides a semiconductor laser in the form of a generally prismatic semiconductor body having oppositely disposed upper and lower end and side surfaces. The semiconductor body has a P-N junction plane generally parallel to the upper and lower surfaces.

The junction plane has a principal portion and a lateral portion, an electrode on the upper surface in juxtaposition and coextensive with only the principal portion, and an opposite electrode on the lower surface.

The width of the principal portion of the junction plane in the direction extending between the sides is at least equal to the length of the principal portion in the direction extending between the end surfaces. The thickness of the semiconductor region adjacent the upper surface is substantially less than the width of the principal portion of the junction plane.

IN THE DRAWINGS

FIG. 1 shows an isometric view of an injection laser according to one embodiment of the invention;

FIG. 2 shows a cross-sectional view of the laser of FIG. 1, after the provision of electrodes thereto;

FIG. 3 shows an isometric view of an injection laser (with parts broken away) according to a preferred embodiment of the invention;

DETAILED DESCRIPTION

Figure 4:
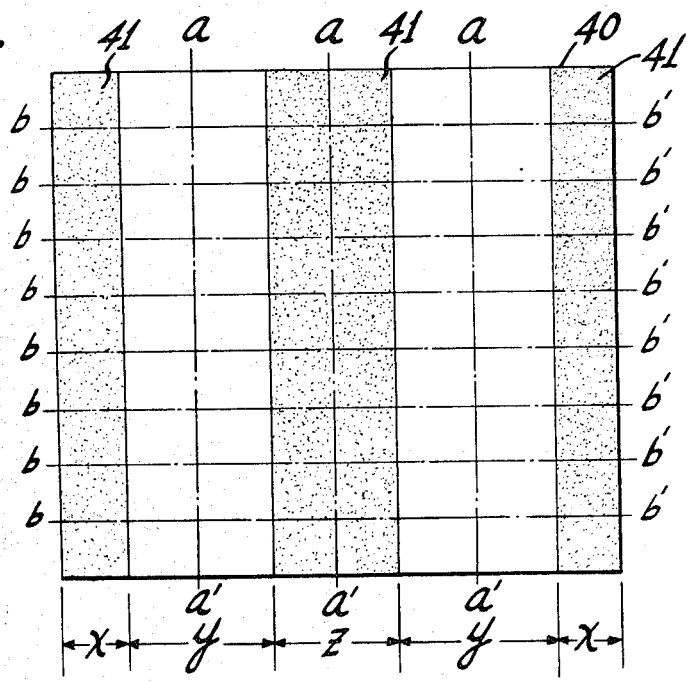
FIG. 4 shows a portion of the semiconductor wafer, utilized in manufacturing the laser of FIG. 3, at an intermediate stage of manufacture.

The injection laser 1 may comprise a body of so-called direct semiconductor material, such as (i) gallium arsenide or (ii) gallium arsenide-phosphide, $GaAs_{1-x}P_x$ in which $x$ is less than 0.44. In the examples thereafter given, gallium arsenide comprises the semiconductor material.

The injection laser 1 is shown, for the sake of clarity, without electrodes in FIG. 1, the electrodes being shown in detail in FIG. 2.

The injection laser 1 is of generally prismatic form having upper and lower surfaces 2 and 3, side surfaces 4 and 5 and reflective end surfaces 6 and 7. The end surfaces 6 and 7 are rendered reflective by cleaving, polishing and/or coating with a suitable reflective material. Preferably, the end surface 7 should be rendered totally reflective and the end surface 6 should be partially reflective.

The laser 1 comprises a relatively thin P type region 8 and a relatively thick N type region 9, with a P-N junction plane 10 therebetween.

An electrode 11 (see FIG. 2) is disposed on the upper surface 2 adjacent a principal portion 12 of the junction plane 10. The electrode 11 comprises a laminate of electroless nickel and gold layers 13 and 14, respectively.

An electrode 15 is disposed on the lower surface 3 and comprises a laminate of evaporated tin, electroless nickel and electroless gold layers 16, 17 and 18, respectively.

The side surfaces 4 and 5 are roughened, as by lapping or sawing, to render them relatively non-reflective or diffusing.

The part of the P type region 8 adjacent and coextensive with the principal portion 12 of the -P-N junction plane 10 has a width $w$ equal to or greater than its length $l$ between the reflective end surfaces 6 and 7. Typically, the width $w$ may be on the order of 50 mils and the length $l$ may be on the order of 12 mils.

The P-N junction plane 10 has lateral portions 19 and 20 through which no substantial current flow takes place when the P-N junction 10 is forward biased. The part of the P type region 8 coextensive with the lateral junction plane portions 19 and 20 has a thickness $r$ which is less than the thickness $t$ of the part of the P type region 8 coextensive with the principal junction plane portion 12. Typically, the thickness dimension $r$ may be on the order of 0.5 mil, while $t$ may be on the order of 1 mil. The overall height $h$ of the semiconductor body may be 3 to 4 mils. The width $d$ of each of the lateral junction plane portions 19 and 20 may be on the order of 15 mils.

In operation, a relatively positive potential is applied to the electrode 11 and a relatively negative potential to the electrode 15 to forward bias the P-N junction 10. Due to the disposition of the electrode 11 coextensive with only the principal portion 12 of the junction plane 10, current flow across the junction is confined primarily to this principal portion. Since the width $w$ of the part of the P type region 8 coextensive with the principal junction plane portion 12 is substantially greater than the thickness $t$ of this part, the effects of current spreading beyond the lateral dimensions of the electrode 11 are negligible.

When the potential difference between the electrodes 11 and 15 is increased to a value sufficient to provide a current across the P-N junction 10 in excess of the threshold value, lasing occurs, accompanied by the emission of coherent light from the end surface 6 in the direction indicated by the dot-dash arrow in FIG. 1.

Relatively high power output is obtained due to the relatively wide lateral dimension of the principal portion 12 of the P-N junction plane 10. The lateral portions 19 and 20 do not exhibit gain, and attenuate undesired parasitic optical modes by free carrier absorption in the bulk of the P type semi-conductor material.

In order to minimize Joule heating, the conductivity of the P type region 8 should be quite high. When zinc is employed as the acceptor impurity material, a doping level on the order of $3 \times 10^{19}/cm.^3$ is employed. The corresponding doping level in the N type region 9, with tellurium as the donor impurity material, should preferably be on the order of $2 \times 10^{18}/cm.^3$ in order to provide good operating efficiency.

The thickness $t$ of the part of the P type region 8 coextensive with the principal portion 12 of the P-N junction plane 10 is not critical, and may preferably be in the range of 0.1 to 2 mils.

With the structure shown in FIG. 1, as well as the preferred embodiment shown in FIG. 3, power output is increased by a factor of 3 to 4 above that exhibited by a similar injection laser without the lateral regions 19 and 20.

The injection laser of FIGS. 1 and 2 is fabricated by epitaxial solution growth of a zinc doped P type layer on a tellurium doped N type substrate. After lapping to reduce the epitaxial layer to the desired thickness and to obtain a clean surface, a thin layer of tin is evaporated onto the lower surface of the wafer at a temperature on the order of 400° to 550° C. Thereafter the wafer is immersed in an electroless nickel plating bath, followed by an electroless gold plating solution to form the electrodes 11 and 15.

After the electrodes have been formed, the epitaxial P type layer is lapped to eliminate metal from and reduce the thiickness of the parts of the P type layer 8 which are to be adjacent the lateral portions 19 and 20 of the P-N junction plane 10. The wafer is then separated into individual devices by sawing to provide roughened sides 4 and 5 for each device, and by cleaving to provide reflective end surfaces 6 and 7.

While FIGS. 1 and 2 show an injection laser having two spaced lateral portions 19 and 20 with the principal portion 12 of the junction plane 10 disposed therebetween, improved results are also obtained if only one such lateral portion is provided.

While the parts of the P type layer 8 coextensive with the lateral portions 19 and 20 of the junction plane 10 are of reduced thickness in order to minimize current spreading, I prefer to employ a structure in which the thickness of the P type epitaxial layer is uniform throughout.

Such a structure is utilized in the laser diode 30 shown in FIG. 3. As in the case of the diode 1, the laser 30 comprises a body of semiconductor material having opposed upper and lower surfaces, diffused sides and reflective end surfaces which provide a resonant optical cavity. The laser 30 has an upper electrode 31 adjacent and coextensive with a principal portion 32 of the P-N junction plane 33. The junction plane 33 is disposed between an N type substrate 34 and a P type epitaxial layer 35. An electrode 36 is disposed on the lower surface of the diode 30.

The dimensions L, W and H of the laser 30 correspond to and are equal to the dimensions $l$, $w$ and $h$ of the laser 1. The thickness of the epitaxial layer 35 of the laser 30 is on the same order as the thickness dimension $r$ of the P type epitaxial layer 8 of the laser 1. The electrodes 31 and 36 of the laser diode 30 are similar to the electrodes 11 and 15 of the laser diode 1, respectively.

The P-N junction plane 33 has a lateral portion 37 which is relatively remote from the electrode 31 and is covered by a thin protective silicon monoxide insulating layer 38, having a thickness on the order of 1000 angstroms. The lateral junction plane portion 37 does not exhibit gain, since any current flowing across the P-N junction 33 in the forward bias direction is confined substantially to the principal portion 32. The part of the P type epitaxial layer 35 coextensive with the lateral junction plane portion 37 exhibits free carrier absorption of undesired parasitic optical modes generated at the principal junction plane portion 32.

Since light generated in the vicinity of the forward biased junction of an injection laser emanates from the P type side of the junction, improved absorption of unwanted optical modes is obtained by employing a portion of the P type layer itself as the light absorbing medium. This is so in the case of the mesa type laser diode 1 as well as the planar type laser diode 30.

Typically, the width W of the principal portion 32 of the junction plane 33 may be on the order of 50 mils, while the width of the lateral portion 37 of the junction plane 33 may be on the order of 30 mils, yielding an overall laser width of 80 mils. The corresponding optical cavity length L may be on the order 12 mils.

The laser 30 may be manufactured economically by means of batch processes from a relatively large semiconductor wafer 40, as shown in FIG. 4.

The semiconductor wafer 40 is first processed to provide an epitaxial P type layer on an N type substrate, with a radiative P-N junction therebetween. After lapping and polishing to obtain the desired epitaxial layer thickness, a number of strips 41 are formed by evaporating silicon monoxide onto the wafer 40 at a wafer temperature on the order of 450° C., by means of a suitable mask. The silicon monoxide strips are carefully deposited so that the long dimension of each strip is precisely parallel to the $<110>$ crystallographic cleavage plane. The widths of the strips are such that the dimensions $x$, $y$ and $z$ are approximately 40, 120 and 80 mils, respectively.

The electrode layers 31 and 36 are then applied to the upper and lower major surfaces of the wafer 40, except in the regions covered by the silicon monoxide strips 41, in similar manner to that described for metallization of the laser diode 1. Thereafter the wafer is cleaved along the line $a$–$a'$, parallel to the $<110>$ cleavage plane. The cleaved surfaces, which correspond to the sides of the individual laser diodes 30, are lapped in order to roughen the sides. The lapping process removes approximately 10 mils of semiconductor material from each side of each cleaved strip.

The cleaved and lapped strips are then each cleaved along lines $b$–$b'$, parallel to the $<\overline{110}>$ crystallographic cleavage plane, to yield several laser diodes 30.

While laser diodes of the type shown in FIG. 3 yield high power output with good efficiency, very large currents may be required to obtain these power levels. For example, a single laser diode 30 having an active width W of 50 mils may require a peak current on the order of 600 amp to produce a 100 watt output. Pulsing circuits capable of delivering such high currents are extremely complex, unreliable and bulky.

It therefore is advantageous to employ, e.g., two diodes in electrical series connection to reduce the required peak current. Conventional structures, however, do not permit the close alignment of such series connected diodes, so that it has not heretofore been practicable to provide a series connected structure in which the two diodes are in such close proximity that the optical radiation emitted therefrom appears to originate from a single source.

Figure 5:
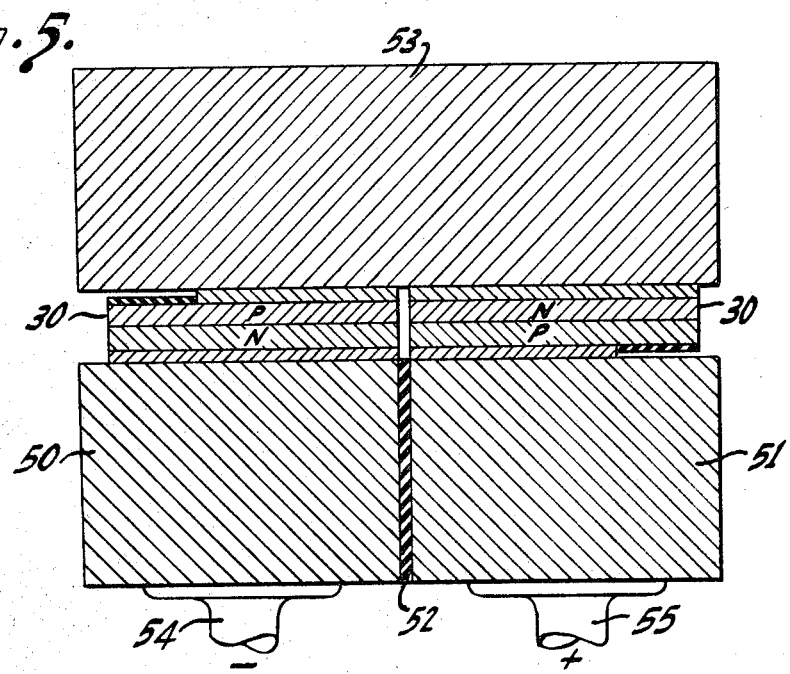
FIG. 5 shows a high power array employing two injection lasers of the type shown in FIG. 3.

Such a structure, however, is quite feasible with laser diodes of the type shown in FIG. 3, as is seen by reference to FIG. 5.

In the series connected structure of FIG. 5, one laser diode 30 has the electrode adjacent the N type region thereof in intimate contact with a relatively massive metallic member 50 of good thermal and electrical conductivity. Similarly, another laser diode 30 is oriented with the electrode adjacent its P type region in intimate contact with another relatively massive metallic member 51, likewise of good thermal and electrical conductivity.

The members 50 and 51 are in close proximity, being separated by a thin insulating layer 52 which has a thickness on the order of 1 mil. The laser diodes are positioned on the members 50 and 51 so that the principal junction plane portions thereof are in close proximity, the adjacent sides of the diodes being spaced by approximately 1 mil.

A third relatively massive metallic member 53, of good electrical and thermal conductivity, has a conductive surface in intimate contact with the other electrode of each laser diode 30. Terminal leads 54 and 55 are electrically connected to members 50 and 51, respectively. By application of a relatively positive potential to the terminal lead 55 and a relatively negative potential to the terminal lead 54, current flows through both diode P-N junctions in the forward bias direction.

In one particular test, two 25 mil wide diodes connected in the package structure of FIG. 5 delivered a peak power output of 70 watts at a peak current of 220 amp. A single 50 mil wide diode, in a conventional package, required a peak current of 400 amp. to deliver the same power.

I claim:
1. A semiconductor laser, comprising:
a generally prismatic body of semiconductor material having upper and lower oppositely disposed surfaces, a pair of oppositely disposed reflective end surfaces intersecting said upper and lower surfaces and a pair of oppositely disposed relatively nonreflective sides intersecting said upper, lower and end surfaces,
   said body having first and second contiguous regions of mutually opposite type conductivity forming a P-N junction plane at the interface therebetween,
   said junction emitting optical radiation when a current is passed therethrough in the forward bias direction,
   said junction plane being generally parallel to said upper and lower surfaces and substantially normal to said end surfaces,
   said junction plane having a principal and a lateral portion, each of which portions extends from one of the end surfaces of the body to the other end surface and the lateral portion extends along a side of said body;
a first electrode on said upper surface contiguous with said first region and in juxtaposition and co-extensive with only said principal portion; and
a second electrode on said lower surface contiguous with said second region and opposite said first electrode,
   the width of said principal portion in the direction extending between said sides being at least equal to the length of said principal portion in the direction extending said end surfaces,
   the thickness of said first region being substantially less than the width of aid principal portion.

2. A laser according to claim 1, wherein said first region is of P type conductivity.

3. A laser according to claim 2, wherein the part of said first region adjacent the principal portion of said junction plane is thicker than the part of said first region adjacent the lateral portion of said plane.

4. A laser according to claim 2, wherein said lateral portion comprises a pair of spaced areas, and said principal portion is centrally disposed between said areas.

5. A laser according to claim 2, wherein the width of the part of said first region adjacent the lateral portion of said junction plane is substantially greater than the thickness of said first region.

6. A laser according to claim 1, wherein said material comprises gallium arsenide or gallium arsenide-phosphide.

7. A series connected array of two semiconductor lasers, each laser being according to claim 1, comprising:
a first relatively massive member of good thermal conductivity having an electrically conductive surface, the second electrode of one of said lasers being contiguous with said conductive surface;
a second relatively massive member of good thermal conductivity having an electrically conductive surface, the first electrode of the other of said lasers being contiguous with the conductive surface of said second member, said conductive surfaces being aligned to generally define a terminal plane,
   said lasers being disposed on said members so that their principal junction plane portions are in close proximity;
a third relatively massive member of good thermal conductivity having an electrically conductive major surface contiguous with the first electrode of said one laser and the second electrode of said other laser; and
first and second terminal leads electrically coupled to the conductive surfaces of said first and second members, respectively.

8. A semiconductor device, comprising:
(a) a body of semiconductor material having P and N type regions forming a substantially planar P-N junction therebetween and a pair of end surfaces at opposite ends of said body which are substantially perpendicular to said junction and to a given axis of said device,
(b) a first electrode on a surface of one of said regions substantially parallel to said junction and extending from one of the end surfaces of the body to the other end surface,
(c) a second electrode on a surface of the other of said regions substantially parallel to said junction,
(d) said first electrode having a dimension parallel to said junction and perpendicular to said axis which is (i) substantially less than the corresponding dimension of said junction, (ii) at least equal to the axial dimension of said junction, and (iii) substantially greater than the thickness dimension of said one region perpendicular to said junction.

References Cited
UNITED STATES PATENTS

| | | | |
|---|---|---|---|
| 3,427,563 | 2/1969 | Lasher | 331—94.5 |
| 3,436,679 | 4/1969 | Fenner | 331—94.5 |

RONALD L. WIBERT, Primary Examiner

E. S. BAUER, Assistant Examiner

U.S. Cl. X.R.

317—234